United States Patent
Parias

(10) Patent No.: US 7,891,250 B2
(45) Date of Patent: Feb. 22, 2011

(54) METHOD AND APPARATUS TO DIGITIZE PRESSURE GAUGE INFORMATION

(75) Inventor: Thomas Parias, Croisy-sur-Seine (FR)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 11/696,249

(22) Filed: Apr. 4, 2007

(65) Prior Publication Data

US 2008/0245155 A1    Oct. 9, 2008

(51) Int. Cl.
  *G01L 7/00*    (2006.01)
(52) U.S. Cl. .......................................... 73/700; 73/715
(58) Field of Classification Search ............ 73/700–756
  See application file for complete search history.

(56) References Cited

U.S. PATENT DOCUMENTS

| | | | |
|---|---|---|---|
| 4,221,134 A | 9/1980 | Ekstrom, Jr. | |
| 4,455,874 A * | 6/1984 | Paros ........................... | 73/704 |
| 4,643,030 A | 2/1987 | Becker et al. | |
| 4,718,279 A | 1/1988 | Hestich | |
| 4,794,949 A * | 1/1989 | Sakai ........................... | 137/557 |
| 5,052,586 A * | 10/1991 | Philipp et al. .................. | 222/3 |
| 5,065,631 A | 11/1991 | Ashpitel et al. | |
| 5,121,637 A * | 6/1992 | Philipp et al. ................. | 73/742 |
| 5,157,372 A | 10/1992 | Langford | |
| 5,309,135 A | 5/1994 | Langford | |
| 5,321,257 A | 6/1994 | Danisch | |
| 5,349,866 A * | 9/1994 | Huang .......................... | 73/727 |
| 5,656,772 A * | 8/1997 | Markel ........................ | 73/146.8 |
| 6,216,541 B1 * | 4/2001 | Carpenter ..................... | 73/741 |
| 6,343,627 B1 * | 2/2002 | Hasaka et al. ................. | 141/18 |
| 6,425,252 B1 * | 7/2002 | Kobayashi et al. ............. | 62/77 |
| 6,494,343 B2 * | 12/2002 | McManus et al. ............. | 222/55 |
| 6,530,281 B2 * | 3/2003 | Chou ........................... | 73/733 |
| 6,843,115 B2 * | 1/2005 | Rutherford ................. | 73/146.8 |
| 7,047,811 B2 * | 5/2006 | Sherman et al. ............... | 73/708 |
| 7,228,743 B2 * | 6/2007 | Weiss .......................... | 73/732 |
| 7,234,346 B2 * | 6/2007 | Nelson ........................ | 73/149 |
| 7,278,317 B2 * | 10/2007 | Bessette et al. ............... | 73/708 |
| 7,737,372 B2 * | 6/2010 | Dougherty et al. .......... | 177/245 |

FOREIGN PATENT DOCUMENTS

| | | |
|---|---|---|
| GB | 1146923 | 3/1969 |
| GB | 2190199 | 11/1987 |
| JP | 62080533 | 4/1987 |

(Continued)

OTHER PUBLICATIONS

Flexpoint Sensor Systems, Inc., "Bend Sensor", www.flexpoint.com (2005).

(Continued)

*Primary Examiner*—Lisa M Caputo
*Assistant Examiner*—Jermaine Jenkins
(74) *Attorney, Agent, or Firm*—Donna Blalock Holguin

(57) ABSTRACT

This invention uses a flexible gauge to digitize an analogue signal from a mechanical gauge. In particular, this invention uses a flexible gauge to digitize an analogue signal from a mechanical pressure gauge. More particularly, this invention uses a flexible gauge to digitize an a analogue signal from a mechanical pressure gauge that uses a Bourdon tube.

16 Claims, 3 Drawing Sheets

FOREIGN PATENT DOCUMENTS

| JP | 62080533 A | * | 4/1987 |
|---|---|---|---|
| WO | WO 2004/053450 | | 6/2004 |

OTHER PUBLICATIONS

Anonymous: "Process Pressure Measurement", Transaction in Measurement and Control Force-Related Measurements, (online) vol. 3, Feb. 9, 2005, pp. 26-29, URL: http://www.omega.com/literature/transactions/transaction_Vol_III.pdf.).

Bijl W. Van Der: "The Digitisation of Field Instruments" Journal A, Soft Vision, Brussels, BE, vol. 32, No. 3, Oct. 1, 1991, pp. 62-65.

Anonymous: "Pressure Gages and Flowmeters", 2003 Fluid Power Directory, Oct. 25, 2005, pp. 176-178, URL: http://cobweb.ecn.purdue.edu.

Isaac, Charles: "Selecting a Pressure Switch, Without the Pressure" Machine Design, Feb. 8, 2001, URL:http://machine design.com.

Search Report for PCTIB2008/051221, Jan. 4, 2008.

International Preliminary Report on Patentability and Written Opinion for PCT/IB2008/051221, Jan. 4, 2008.

\* cited by examiner

METHOD AND APPARATUS TO DIGITIZE
PRESSURE GAUGE INFORMATION

BACKGROUND OF THE INVENTION

1. Field of the Invention

This invention relates to the digitization of an analogue signal mechanical gauge. Particularly, this invention relates to the digitization of an analogue signal from a mechanical pressure gauge. More particularly, this invention is related to the digitization of an analogue signal from a mechanical pressure gauge that uses a Bourdon tube.

2. Description of the Related Art

The measure of pressure is often a key parameter when dealing with gases. Pressure gauges have been used on cylinders of compressed industrial gas for a long time and many different types of technologies are currently available in the market. Over the past couple of decades gauges have been introduced in the head of cylinders to provide a measurement of the pressure inside the cylinder or at the outlet of the cylinder. Pressure reducers have also had integrated gauges for some time.

Perhaps the most common type of gauge is the mechanical gauge. This type of technology has been used for a long time, and is continuously being improved upon. Well known systems, such as Bourdon tube, are very often used to measure both high and low pressure. These types of gauges typically are very low in cost, perhaps on the order of $2 to $4 each. Despite the relatively low cost, this type of gauge still offers information that is visual, the precision of which relies on the accuracy of the viewer.

However, a large part of the market routinely relies on electronic gauges. These gauges rely on Wheatstone Bridge principle which includes a measuring cell. Such cells are typically based on piezoelectric devices, or similar technology, which has physical properties that are modified by the pressure and then measured by the Wheatstone Bridge. Analogous examples of such systems may be found in U.S. Pat. No. 4,643,030, wherein a set of strain gauges are affixed to an automotive torque wrench, and U.S. Pat. No. 5,065,631, wherein a tube containing strain gauges is affixed to a metal structure.

These types of electronic gauges are very precise, the sensing cell and the Wheatstone Bridge packaged to fit a high pressure application may typically cost from $7 to $15 each for the simplest technologies. The measurement of the pressure of gas inside of a cylinder is often designed to use pressure reducers, a screen and all the necessary electronics, as well as the necessary batteries. Packaged technologies that apply to the measurement of cylinders of industrial gas may range from $30 to $200.

Some manufacturers have moved to intermediate technologies, that fill the gap between those two extremes. One of the most common solutions has been to use a rheostat mechanically linked to the axe of the needle of a mechanical gauge. Such a solution is cheaper than a digital solution, however it is usually necessary to significantly modify the design of the gauge itself. Others such as Mija, a Connecticut based company which manufacture sensors for fire extinguishers, has developed a system that fits inside the gauge and features devices to detect the relative position of the needle of the mechanical gauge.

A need exists within the industry, for an inexpensive, yet reliable and accurate means to retrofit existing mechanical pressure gauges in such a way as to produce a digital signal.

SUMMARY OF THE INVENTION

In one aspect of the present invention, a digitized gauge is provided. The digitized gauge includes a device with a component that deforms during a change in a state variable. The apparatus also includes a means for quantifying the degree that this component deforms. The quantifying means has an output means. The apparatus also includes a means of attaching the component to the quantifying means, in such a way that the component may still deform.

In yet another aspect of the present invention, a digitized gauge is provided. The digitized gauge includes a pressure gauge that includes a Bourdon tube. The apparatus also includes a bending sensor. The bend sensor has an output means. The apparatus also includes an attaching means capable of attaching the bending sensor to the Bourdon tube.

BRIEF DESCRIPTION OF THE DRAWINGS

The invention may be understood by reference to the following description taken in conjunction with the accompanying drawings, and in which.

DETAILED DESCRIPTION OF SPECIFIC EMBODIMENTS

Figure 1:
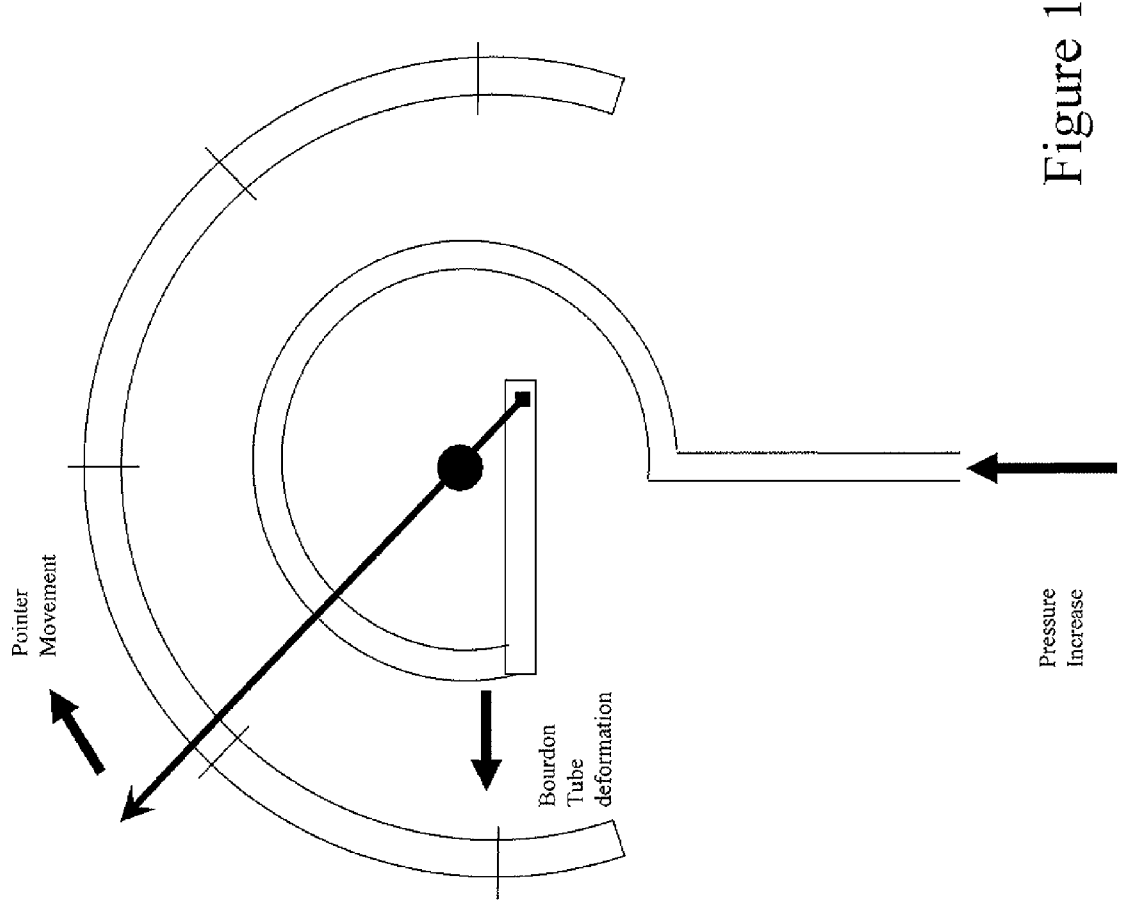
FIG. 1 is a schematic of one prior art approach to measuring pressure changes with pressure gauge using a Bourdon Tube.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The invention digitizes pressure measurement obtained by a mechanical gauge. There is a growing interest to add value to simple equipment, such as gas cylinders or pressure reducer, to bring them from simple commodity status to the status of a useful tool that may support asset management initiatives or be inter-operable with surrounding devices.

The challenge is to have a technology that can meet existing standards, while being low cost, and representing as little breakthrough as possible in the interface with the user. The proposed solution is to rely on the existing technology of mechanical gauge, and to digitize the pressure measurement, by taking advantage of the measurement of the mechanical displacement of one or another piece of the mechanical gauge with a flexible sensor system. One non-limiting example of such a flexible sensor system is the Bend Sensor® from Flexpoint Sensor Systems, Inc. Another non-limiting example of such a flexible sensor system may be found in U.S. Pat. No. 5,321,257.

The Bourdon tube technology commonly used in mechanical pressure gauges, relies on the deformation of a tube under the pressure. This is illustrated in FIG. 1. As the end of the Bourdon tube is exposed to an increase (or decrease) of pressure, the mechanical stresses within the Bourdon Tube cause it to flex, and thereby change it's radius of curvature. FIG. 1 illustrates a very simplified version of the type of linkage that would connect the end of the Bourdon Tube to an indicating pointer. As the Bourdon Tube changes it's radius of curvature, the pointer magnifies this deflection and indicates a change in pressure on the dial.

Figure 2:
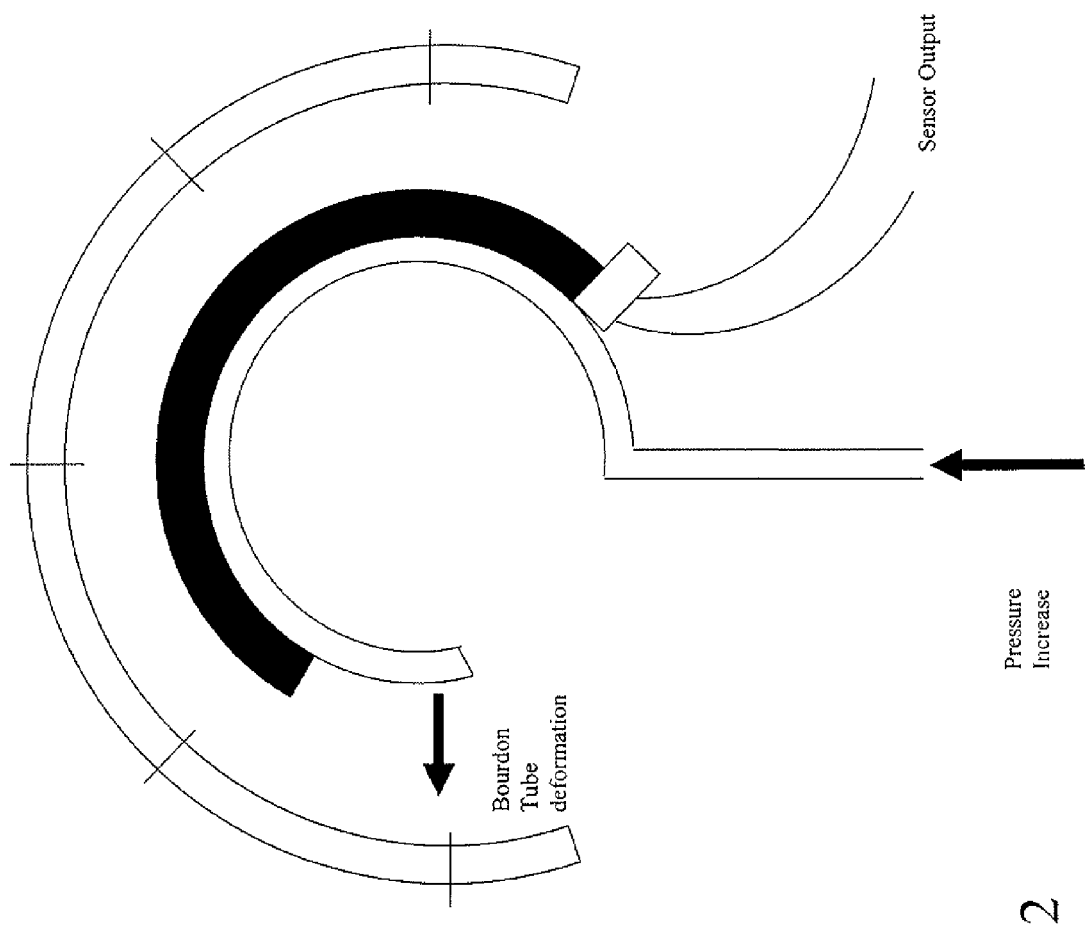
FIG. 2 is a schematic of the present invention as applied to a pressure gauge using a Bourdon Tube.

Now turning to FIG. 2, we see a bending sensor applied directly on the Bourdon Tube. The pointer may remain in place on the physical gauge, but it has been removed from FIG. 2 for clarity. As the Bourdon Tube deflects due to an increase (or decrease) in pressure, the flexible sensor deflects as well. This flexible sensor can be calibrated to all the direct measurement of this deformation, and hence the change in pressure. This is a low cost, reliable means to digitize the measure of the pressure.

Figure 3:
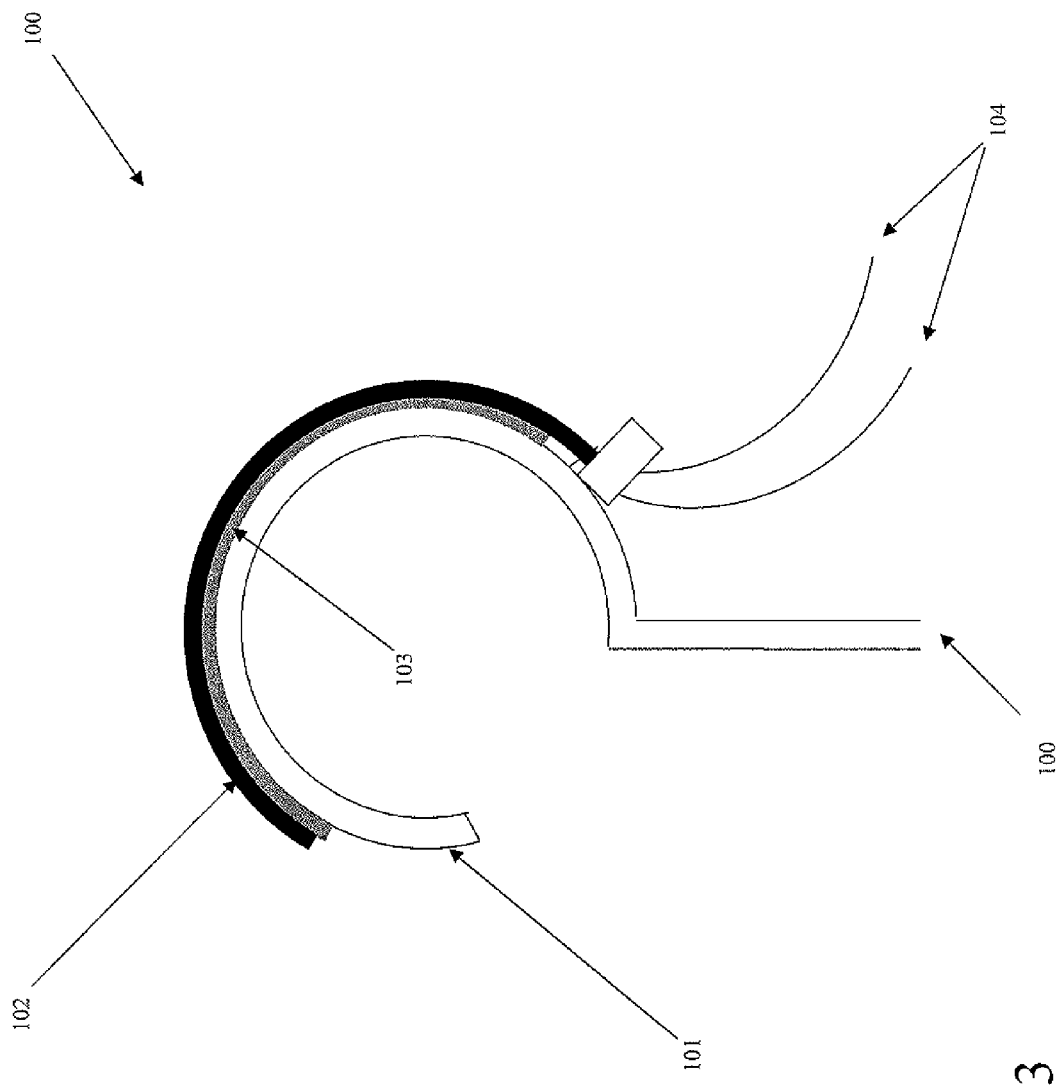
FIG. 3 is a schematic of the present invention as applied to a pressure gauge using a Bourdon Tube.

Turning now to FIG. 3, a method and apparatus for digitizing a gauge 100 in accordance with the embodiments of the present invention is illustrated. The digitized gauge 100 comprises a component that deforms during a change in a state variable 101, a means for quantifying the degree of this deformation 102, a means for attaching 103 the quantifying means 102 to the deforming component 101, and an output means 104 for said quantifying means 102.

In one embodiment of the present invention, a pressure gauge containing a Bourdon tube is utilized. The pressure gauge is disassembled to the point which the Bourdon tube is accessible. A sensor that is flexible, and for which a change in deformation results in a change in a measurable output is then attached to the Bourdon tube. Any means of attachment known to the skilled artisan may be used, and may include, but not be limited to, double sided tape, epoxy putty, construction adhesive, etc.

Calibration of the sensor may occur just before the final assembly of the gauge to the protective case and lens, or after gauge assembly. The assembly consisting of the original pressure gauge with the flexible sensor attached, is connected to a pressure source with a known "master" gauge. A "master" gauge is simply a high accuracy gauge of known calibration. Adjustments are made in the assembly until the measured output from the flexible sensor reflects the same pressure readings as the master. Several different pressure levels may be needed in order to fully calibrate the flexible gauge.

The bending sensor produces very clear and repeatable changes in the measured electrical resistance while the pressure changes, and arrow moves. One advantage of this invention is that the integration is very easy since it does not require modification of the existing package of the gauge. Another advantage of this invention is that the cost of the whole system is almost as low as the cost simple mechanical gauges.

Placed at critical places, such as a minimal level, or at different places related to the pressure, a bending sensor would be very useful to produce digital information. This digital information may be fed directly to a local programmable logic controller (PLC), or to a centralized distributed control system (DCS). This invention of a low cost digital pressure sensor, may used in telemonitoring of moving assets with gas under pressure, such as, gas cylinders. This invention may also be used to provide a low cost system that is able to enforce supervision of a gas network inside a plant, or any type of such building.

In one embodiment of the present invention, the electrical resistance of the flexible gauge changes with the degree of deformation experienced by the flexible gauge. The electrical resistance may be measured by an external measuring means. This external measuring means may send a signal from the flexible gauge to an external receiving means. The signal that is transferred from the external measuring means may or may not be processed by the external measuring means. The external receiving means may be a distributed control center (DCC) or a programmable logic controller (PLC). In one embodiment the flexible sensor may generate a signal that may be received by an external receiving means.

What is claimed is:

1. A system for the telemonitoring of moving assets with gas under pressure, said system comprising at least one gas cylinder containing compressed industrial gas, said gas cylinder having attached thereto a digitized pressure gauge for measuring the pressure of the gas inside of the gas cylinder wherein the pressure gauge comprises i) a gauge with a component that deforms during a change in pressure, ii) a means of quantifying the degree of said deformation, said quantifying means comprising an output means, and iii) an attaching means capable of attaching said component to said quantifying means in such a way as to allow said component to deform.

2. The system of claim 1, wherein the quantifying means of the pressure gauge is a bending sensor.

3. The system of claim 2, wherein the electrical resistance measured at said output means of said bending sensor is a function of the deflection experienced by said bending sensor.

4. The system of claim 3, wherein said electrical resistance at said output means is measured by an external measuring means.

5. The system of claim 4, wherein said external measuring means generates a signal that is sent to an external receiving means.

6. The system of claim 5, wherein said external receiving means is a distributed control center.

7. The system of claim 5, wherein said external receiving means is a programmable logic controller.

8. The system of claim 1, wherein said quantifying means further comprises a signal generation means, that generates a signal that is sent to an external receiving means.

9. The system of claim 8, wherein said external receiving means is a distributed control center.

10. The system of claim 8, wherein said external receiving means is a programmable logic controller.

11. A system for the telemonitoring of moving assets with gas under pressure, said system comprising at least one gas cylinder containing compressed industrial gas, said gas cylinder having attached thereto a digitized pressure gauge for measuring the pressure of the gas inside of a gas cylinder wherein the pressure gauge comprises i) a pressure gauge comprising a Bourdon tube, ii) a bending sensor comprising an output means, and iii) an attaching means capable of attaching said bending sensor to said Bourdon tube.

12. The system of claim 11, wherein the electrical resistance measured at said output means of said bending sensor is a function of the deflection experienced by said bending sensor.

13. The system of claim 11, wherein said electrical resistance at said output means is measured by an external measuring means.

14. The system of claim 13, wherein said external measuring means generates a signal that is sent to an external receiving means.

15. The system of claim 14, wherein said external receiving means is a distributed control center.

16. The system of claim 14, wherein said external receiving means is a programmable logic controller.

* * * * *